United States Patent [19]

Jonsson

[11] Patent Number: 5,555,298
[45] Date of Patent: Sep. 10, 1996

[54] METHOD AND SYSTEM FOR ESTABLISHING A CONNECTION BETWEEN PARTIES IN A NETWORK

[75] Inventor: Björn E. R. Jonsson, Järfälla, Sweden

[73] Assignee: Telefonaktiebolaget LM Ericsson, Stockholm, Sweden

[21] Appl. No.: 18,214

[22] Filed: Feb. 16, 1993

[30] Foreign Application Priority Data

Feb. 17, 1992 [SE] Sweden .................................. 9200469

[51] Int. Cl.⁶ .............................. H04M 3/42; H04M 7/00
[52] U.S. Cl. ........................... 379/207; 379/203; 379/219
[58] Field of Search ..................................... 379/201, 202, 379/203, 204, 205, 206, 207, 209, 219, 220, 221

[56] References Cited

U.S. PATENT DOCUMENTS

| | | | |
|---|---|---|---|
| 4,172,969 | 10/1979 | Levine et al. | 379/97 X |
| 4,317,007 | 2/1982 | Harrison | 379/196 X |
| 4,763,191 | 8/1988 | Gordon et al. | 379/201 X |
| 4,796,293 | 1/1989 | Blinken et al. | 379/202 |
| 4,899,375 | 2/1990 | Bauer et al. | 379/264 |
| 4,910,766 | 3/1990 | Ogino et al. | 379/201 |
| 4,924,500 | 5/1990 | Lewis et al. | 379/201 |
| 4,933,966 | 6/1990 | Hird et al. | 379/132 |
| 5,048,081 | 9/1991 | Gavaras et al. | 379/221 |

FOREIGN PATENT DOCUMENTS

| | | |
|---|---|---|
| 0140351 | 5/1985 | European Pat. Off. . |
| 0435449 | 7/1991 | European Pat. Off. . |
| WO89/10044 | 10/1989 | WIPO . |
| WO92/01350 | 1/1992 | WIPO . |

Primary Examiner—Krista M. Zele
Assistant Examiner—Harry S. Hong
Attorney, Agent, or Firm—Burns, Doane, Swecker & Mathis, L.L.P.

[57] ABSTRACT

A method and a system for establishing in real time a connection between a first party and a second part via at least one telecommunication network. The connection is initiated by sending a connection request containing the meeting reference of each party in the telecommunication network or networks to a third party, called the meeting organizer which, on the basis of the connection request and also on the basis of predetermined criteria, reaches a decision as to a favourable common meeting point in a telecommunication network for the first and the second parties. Instances of an assignment process which has the purpose of generating the connection request are used as a reference.

14 Claims, 6 Drawing Sheets

METHOD AND SYSTEM FOR ESTABLISHING A CONNECTION BETWEEN PARTIES IN A NETWORK

TECHNICAL FIELD

The present invention relates to a method for establishing a connection between two parties while using one or more telecommunication networks. More specifically, although not exclusively, the invention relates to a method for establishing the aforesaid connection in the form of a meeting at a meeting point. The meeting point can be placed at any desired node in the network. The method enables the meeting point to be chosen with respect to the geographical location of the parties in the network and with respect to current traffic conditions and in complete disregard of fixed routing tables.

The present invention is related to the following five Patent Applications, to which the following description refers:

(1) "A Method of Establishing an Intelligent Network Service", U.S. patent application Ser. No. 08/018,197;

(2) "A Method of Organizing Communication", U.S. patent application Ser. No. 08/018,223;

(3) "A Method of Establishing Cooperation with a Functionality", U.S. patent application Ser. No. 08/018,268;

(4) "A Person Paging Method", U.S. patent application Ser. No. 08/018,212; and (5) "A Method of Supporting Communication", U.S. patent application Ser. No. 08/018,213.

These applications describe mechanisms which can be used in the method according to the present invention.

TECHNICAL BACKGROUND ART

The term communication services is meant to mean conventional telephony services, telex services, datapack services, datel services, telefax services, videotext services, ISDN-services, mobile telephony services, personal paging services, tele-point-services and general communication between two or more parties. The services recited above are only examples of the services possible and are not intended to limit the scope of the invention.

The term telecommunication network is normally meant to mean the telephone networks, telex networks, circuit connected data networks, picture information transfer networks, private telecommunication networks, radio networks, satellite communication networks and general carriers of the communication services, such as analog transmission, digital transmission, synchronous, multiplex or asynchronous multiplex transmission, ATM, etc., for example. These networks are recited solely by way of example and the invention is not restricted thereto.

The term functionality is meant to mean the ability to perform an operation in a telecommunication network. Examples of functionality include activities and services that can be performed in the telecommunication network. Examples of functionalities include an enquiry to establish a connection path or route between two parties, digit analysis, billing or ticketing. Although not necessary, the functionality may require the availability of dedicated equipment for carrying out the functionality. For instance, if the functionality is to receive tones and to analyze tones, it is necessary to make a tone receiver accessible. Other examples of functionalities include voice-controlled speech information, number translation service, conference calls. Other examples of functionality include the functionalities described in the aforesaid five Swedish patent applications, namely communication in the form of a meeting, personal paging, a method of establishing cooperation with a functionality, meeting connection establishment and communication via intermediaries. Still another example of functionality is the ability of being able to choose from among several alternatives.

The term connection is meant to mean a circuit-coupled connection or a package-coupled connection. The term to establish a connection is meant to mean in the circuit coupled case that a circuit-coupled connection is established between two hardware terminal devices (or equipment) and in the package coupled case it is meant that a package-coupled connection creates relationships between logic channels on node-interconnecting physical links which. The term to originate or to terminate a connection, is meant to mean in the circuit-coupled case to connect originating or terminating equipment to a circuit-coupled connection, and in the package-coupled case to create a session between applications in originating and terminating nodes respectively.

The term user is meant to mean in the following a human user or a computer-based application which utilizes communication services. The application may be achieved with hardware, software and combinations thereof. The word "part" is synonymous to the term user.

The term terminal is meant to mean equipment which is connected to a telecommunication network and which makes the telecommunication services of the network available to a user.

The term port either refers to an access port or to a transit port. An access port is a location where a dedicated terminal is connected to a telecommunication network. An access port is associated with a destination address which goes to an end user. In the case of a standard telephone network, the access ports are located in a telephone station. In the case of the ISDN-network and the mobile telephone network, the access ports are found in a terminal. A transit port is a port in a connection between nodes. A transit port is not associated with any particular destination address, and can be used to establish any selected connection with a final destination. The final destination is given by the destination address. A transit port can transfer a call to another node or can receive a call from another node.

The final destination of a call is a terminal which is identified by a destination identity. The terminal can be present in the same node as a transit port or in some other node to which the call shall be further connected.

One fundamental feature of present-day communication services is that when a party, hereinafter called A, wishes to communicate with another party, hereinafter called B, A sends a call to B, whereupon a connection is established between A and B. The call and the establishment of a connection route is a coupled sequence. By this is meant that the information which A uses in the call, namely information relating to the identification of B's access point in the telecommunication network, causes a connection route, or path, to be established between the parties. This connection can either be circuit-coupled or, in the case of non-continuous transmission methods, a so-called virtual connection, e.g. a package-coupled network, ATM-network (Synchronous transfer mode), etc. Traditionally, a connection is established by establishing a route from an origin to a destination. The connection route through the telecommunication network is controlled by fixed, so-called routing tables which are drawn up when configuring or reconfiguring the network. The routing tables may sometimes permit alternative selections, based on local accessibility information.

The traditional communication network is encumbered with many drawbacks. A first problem concerns handling of the resources of the communication network. Firstly, the communication network is, in itself, a resource which is utilized uneconomically in the traditional method of providing communication services. For example, when party A calls party B, so as to establish a connection through the network from A to B, and party B does not accept the call, the network resources have been used unnecessarily. The same applies when party B is engaged. The case is dependent on the predominant use of present-day networks of channel-associated signalling. This involves establishing a signalling connection, which is then used for speech purposes. With common channel-signalling, which is used primarily in the long-distance network, the signal connection is established with the aid of the data package, or packet, whereas the speech connection, the expensive part of the communication, is not established until B answers. Common channel-signalling is scarcely used in local networks. Secondly, the majority of all established connections do not require party B to act immediately on the information that A will transfer.

In the aforesaid cases, the network resources are either used unnecessarily or are utilized in real time, although it would be possible to utilize the resources at a later time.

Present-day telecommunication services do not enable a party A to call a party B on a telecommunication network and establish communication with party B on a telecommunication network which is different to the first-mentioned network. If the party B has access points in several different telecommunication networks, it is necessary for the party A to have knowledge of all these access points in order to be able to utilize alternative methods of communicating with party B. If party B does not answer in one telecommunication network, it is necessary for party A to attempt to reach party B in another communication network. This means that it is necessary for party A to call on network after network before finally reaching party B. Furthermore, it is also necessary, of course, for party A to have in his/her possession a list of party B's access ports in the different networks at the disposal of party B.

Traditionally, a connection is established between two parties by a party who wishes to communicate with the other party making a call and giving the call destination address, whereafter a coupling route to the called party is established from node to node in a telecommunication network, until the destination node is reached. The calling party is connected to the called party at the destination node. In conventional telecommunication networks, the connection route follows fixed, predetermined routing tables. These routing tables are very seldom changed, and then normally only when extending the telecommunication network. The principle of establishing a connection with the guidance of routing tables is encumbered with several drawbacks.

A first drawback is evident from the following discussion. Two parties who wish to communicate with one another are located at widely separated places in a telecommunication network. When the connection route is established from the calling party, wherein the connection passes from node to node inwardly towards the center of the network, there are many different possibilities of choosing routes to the destination node. The more connection routes that thereafter pass from the center of the network out towards the destination node, the fewer the possibilities of choosing a route to the destination node. Thus, although many routing possibilities are found in towards the center of the network, the routing possibilities outwards from the center of the network become fewer and fewer. This is a drawback in itself. The trunk line on which the discussed connection arrives at the destination node may be congested or blocked while trunk lines in this same destination node are idle. Because of the routing tables, however, these idle trunk lines cannot be placed at the disposal of telephone calls in the direction from which the user connection route arrives at the destination node.

Another drawback with establishing the connection from the node of the called party to the destination node, by switching from node to node through the network in accordance with fixed routing tables, occurs when a node has a fault or is congested, so as to necessitate reversing the route in the network in order to reach a new node and to establish therefrom a new route which will circumvent the obstacle. The routing tables are therefore particularly comprehensive and, above all, categoric, i.e. rigid, and cannot therefore be adapted to current traffic situations.

A large sporting event of a temporary nature is another situation in which blocks can occur in a node. Under such circumstances, there is a very great need for communication from the local node that serves the area or region in which the sporting event takes place. The public, press, radio and television load both the local telephone station and the mobile radio base station serving the area or region in which the sporting event takes place. Blocks occur on the trunk lines to and from the local station/mobile base station, although it may still be possible to establish connections with adjacent local nodes from which it should be possible to establish connections. This is not always possible, however, because of the fixed routing tables.

The application WO-A1-92/01350 relates to a communication arrangement using a callback feature. The originator of a call places a first call to an intermediary, then the originator sends target-identifying information, for example, the telephone number, including relevant country and/or area codes, to the intermediary. The originator also identifies himself to the intermediary. Then the originator hangs up. The intermediary then places a second call to the target, using the target-identifying information, and a third call, the call-back, to the originator, using the originator-identification. When the target answers and the originator answers the second and third calls are interconnected, thus establishing a communication path between the originator and the target.

The drawback with this communication arrangement is that the originator has to use special call routine, differing from the normal call routine, when he wants to use the communication arrangement. First, he must dial a predetermined number, the one to the intermediary, then he must give the target identification, then his own identification, then he must hang up and wait for the call-back from the intermediary. Also the intermediary has to follow a strict procedure in order for the communication arrangement to operate.

This is in contrast to the present invention in accordance with which the originator dials the telephone number to the target in the usual manner and the telephone network, not the originator, uses a special communication arrangement, differing from the known described above, in order to establish communication between the originator and the target.

In accordance with a fifth embodiment of the invention according to the aforesaid WO-A1-92/01350; the first call is parked at a first intermediate after the originator has supplied the target-identifying information. This information is communicated to a second intermediate, situated close to the target. The second intermediator places a second call to the target and a third call, the call-back, to the first intermediator holding the parked first call. When the second call is answered by the target the second and third calls are interconnected and simultaneously the third call is interconnected with the first parked call.

In accordance with this fifth embodiment, the originator does not need to hang up awaiting the connection with the originator. However, the originator has to follow a very specific procedure, different from that used when making a call in the normal manner, which is awkward.

The manner in which the third call is interconnected with the parked first call is not disclosed by the patent specification and poses a technical problem in that the first intermediate cannot differ between an incoming call from the target and an incoming call from anyone else dialling the originator's telephone number.

The main purpose of the communication arrangement in accordance with the application WO-A1-92/01350 is to reduce the costs of a call. If it is cheaper to make a call from e.g. U.S.A. to France than to make the same call from France to U.S.A. then the intermediate is located in the U.S.A. and is used by French originators. If the situation is reversed, i.e., it may for example be cheaper to call from France to the U.S.A. during nighttime in the France, then an intermediate is located in France and is used by U.S. originators. In order to benefit from this known communication arrangement the parties themselves must keep track of the taxes used by the French, and U.S. telephone network operators. In other words an originator must not only use a different communication procedure but must also know if a French or a U.S. intermediate should be called. The situation gets more and more complex as the number of states gets larger.

In accordance with applicant's invention, the network and not the individual keeps track of the taxes and instructs either the originator to make a call to the target or the target to make a call to the originator or instructs both parties to make a call to a common telephone number belonging to a telephone station somewhere between the originator and the target. The network makes its decisions not only with regard to the lowest call cost but also with regard to using the available network resources in the most efficient way. All decisions are taken on a dynamic basis, meaning that the procedure to follow for a specific call may vary depending on traffic intensity, taxes, trunks that are available etcetera., at the time the call is to be setup between the originator and the target. The communication arrangement according the application to WO-A1-92/01350 uses the originators telephone number as originator-ID and the target's telephone number as target-ID. The two ID:s are used only for the purpose of placing a call. In accordance with applicant's invention special numbers, called IA-numbers, connected to a telephone station are used for several purposes amongst them for placing a call between two parties, for selecting the route of a call as taught by the present invention, for supporting communication between a master and foreign users via an intermediator as taught by our co-pending U.S. patent application Ser. No. 08/018,215, for implementing various services such as 800-services as described in our co-pending U.S. patent application Ser. No. 08/018,197.

SUMMARY OF THE DISCLOSURE

One object of the present invention is to provide a communication method which will enable two parties who wish to communicate with each other to be mutually connected in a common meeting point.

The advantage with this method is that the number of routing possibilities available to each of the parties concerned is greater than when the one party is routed and connected to the other. Because the number of routing possibilities is greater, the chances of the parties being connected to one another are also greater.

Another object of the present invention is to provide a communication method which will enable both parties to call a node, referred to as the meeting node, which, in principle, may be found anywhere in the network. The choice of connection route is therewith independent of fixed routing tables. The criteria governing the selection of this meeting node may, for instance, be minimum costs without meeting a block or congestion, the geographical location of the parties in the network, or the traffic load on the network at the time when the meeting shall take place.

Another object of the present invention is to provide a simplified communication method which will enable one or the other party, or both of said parties, to move while the connection is established.

A further object of the invention is to provide a communication method which will enable a meeting point in which the parties are mutually connected to move, wherein the parties are able to establish new connections with the new meeting point.

A further object of the invention is to provide a communication method which will enable the meeting point to behave as a first connection receiver to the one party and as a second connection receiver to the second party, in accordance with the teachings of our aforesaid patent application having Applicant's reference LM 5518, and to enable the meeting point to mutually couple the outgoing connections from the parties concerned to the incoming connections to the meeting point.

Yet another object of the invention is to provide a communication method of the aforesaid kind which can be applied recursively, so that a meeting node that has been chosen as a meeting point can, in turn, chose a new meeting node as a new meeting point, which, in turn, can chose a new node as another new meeting point, and so on, in which the parties are finally connected to each other.

The features characteristic of the present invention are set forth in the following claims.

BRIEF DESCRIPTION OF THE DRAWINGS

The invention will now be described in more detail with reference to the accompanying drawings, in which.

DETAILED DESCRIPTION OF THE DISCLOSURE

Figure 1:
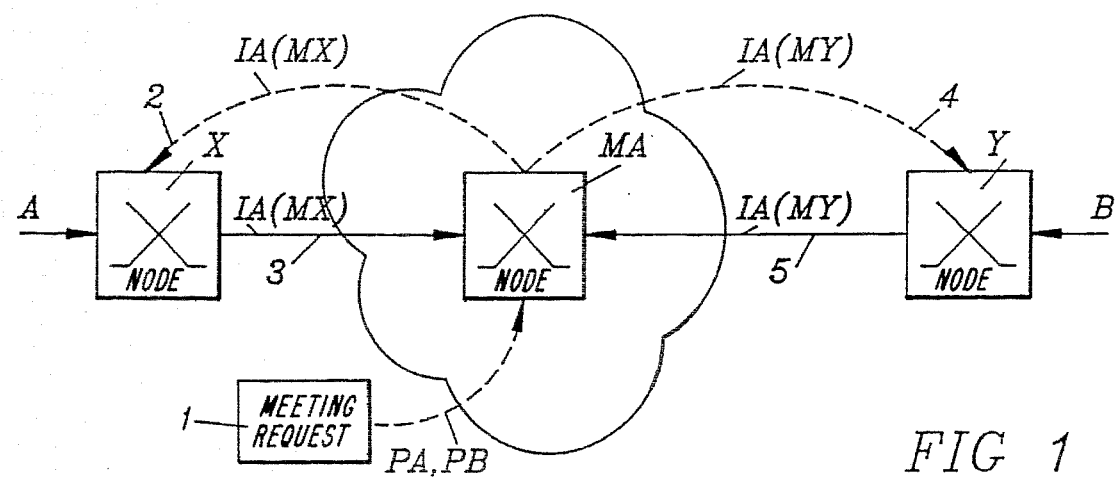
FIG. 1 is a general view illustrating the mutual coaction of a network and nodes when practicing the inventive communication method.

FIG. 1 illustrates a first party A who wishes to communicate with a second party B. The party A is found in a node X and the party B is found in a node Y. Because the parties A and B can be found in one and the same node, the node X may be the node Y. The reference MA identifies a functionality, hereinafter referred to as the meeting organizer or arranger, located in a node of a schematically illustrated telecommunication network T. Although not necessary, the nodes X and Y may be separate from the network T. Each of the nodes X, Y and MA include a respective switch, symbolized by the mutually crossing lines.

Figure 3:
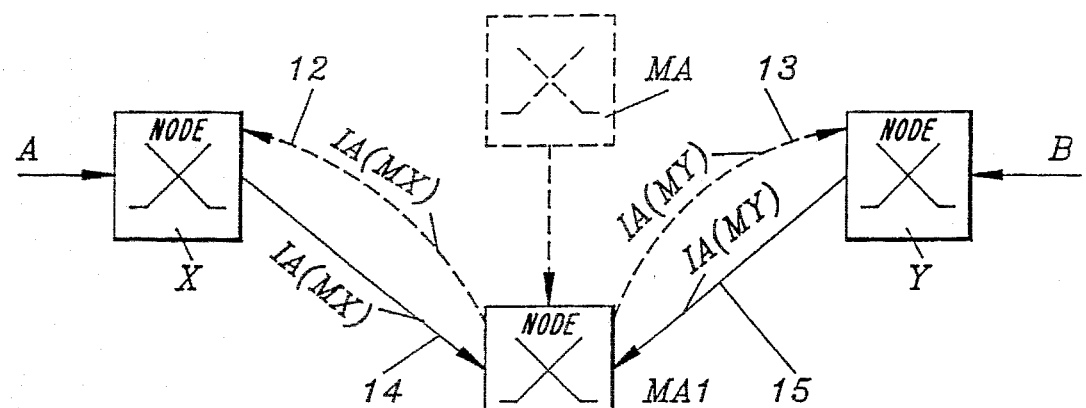
FIG. 3 illustrates a method in which the meeting point is placed on a connection between two nodes.

The invention assumes that the following processes (1)–(4) have taken place before reaching the stage illustrated in FIG. 1 or FIG. 3:

(1) The parties A and B have signalled over a signaling network (not shown in FIG. 1) and have agreed that they both wish to establish a connection with each other and that this connection has resulted in a meeting request or order of the kind described in copending U.S. patent application Ser. No. 08/018,223.

(2) Party A has called party B while giving B's destination address. Node X has received the call and has initiated an assignment process in node X in response to the call. An assignment process is begun each time a call arrives at node X, the purpose of this assignment process being to establish a connection with the called party. The assignment process creates a connection establishing individual, also referred to below as a connection establishing instance, which is specific to the individual call. Expressed more simply, it can be said that the individual assignment process is given an individual name, an individual reference, which is used when other assignment processes in other nodes wish to refer to this individual connection establishing individual. Thus, in this particular case, the assignment process has created a connection establishing individual which has a name or a reference hereinafter called PA (assignment process concerning party A). In addition to referring to the connection establishing individual, the reference PA also refers to the node concerned.

(3) As a result of the signalling process, party B has also made a call and has arrived at his node Y, wherewith an assignment process similar to the afore-described has created a further connection establishing individual, hereinafter referred to as PB (assignment process concerning party B).

(4) Party A and party B shall establish the connection in the form of a meeting and still another assignment process has been signalled via a signalling network (not shown) to a node called a meeting arranger or organizer MA, which organizes a meeting. The meeting organizer is described in U.S. patent application Ser. No. 08/018, 223. More specifically, the meeting shall take place between party A and party B. The assignment process PA handles the connection with A in the node X and the assignment process PB handles the connection with B in the node Y. The references PA and PB have been signalled to the meeting organizer MA.

According to a first embodiment of the invention, there is now established a connection between A and B in the following manner: ((5)–(8), this description being made generally and without reference to any Figure).

(5) When the meeting organizer MA receives the connection order or request, the meeting organizer begins an assignment process whose purpose is (a) to allot to the node X and the node Y a respective interaction reference both of which address a common node, (b) to command node X to call the interaction reference X allotted thereto and to command node Y to call the interaction reference allotted thereto, and (c) to couple together the parties connections in the common node, subsequent to each of said parties having established a respective connection with said common node. The meeting organizer may select the common node on the basis of different criteria described in U.S. patent application Ser. No. 08/018,223. Each assignment process commenced in MA creates a unique meeting individual which is given a name or a reference that points to the individual meeting to which the meeting request or order refers. For the sake of simplicity, the reference to the meeting request or order concerning A and B is abbreviated to MI (meeting individual). This reference could equally as well be MIAB (meeting individual concerning the meeting between the mutually coacting assignment processes PA and PB, which correspond to the meeting between A and B).

(6) When the meeting organizer has created the meeting individual MI and has chosen the common node, called the meeting node, in which the parties shall be mutually connected, the assignment process in the meeting organizer signals the meeting node, over a signal network (not shown), to reserve two interaction references for the meeting concerned. Interaction references are described in U.S. patent application Ser. No. 08/018, 268. Expressed more simply, an interaction reference can be said to be a reference which addresses a specified node, for instance in the network T or in some other telecommunication network, informing the node that the parties wish to communicate with one another in the last-mentioned network. The assignment process in the meeting organizer MA requests the meeting node to signal the reserved interaction references back to the meeting organizer MA, so that the meeting organizer is able to signal one interaction reference to node X and the other interaction reference to node Y.

(7) The assignment process in node X then calls the meeting node and uses the first interaction reference as the destination address, and connects internally party A with the connection to the meeting node established from the node X. The assignment process in node Y calls the meeting node and uses the second interaction reference as the destination address, and connects internally party B in node Y with the connection in the meeting node established from the node Y.

(8) An assignment process is started in the meeting node upon receipt of the request for a reserved interaction reference. When the connections arrive at the meeting node, these connections referring respectively to the first and the second interaction references, the assignment process mutually couples the latter connections in the meeting node, thereby connecting the parties A and B so that they can converse with one another.

The aforedescribed first embodiment of the process of establishing a meeting connection will now be described in detail. The process is described initially with reference to FIG. 1 which illustrates a particular case, namely the case when the common node, the meeting node, is placed in the meeting organizer and not in any other node in the network T.

The assignment process in the meeting organizer creates MI and relates MI to PA and PB. The meeting organizer then reserves two interaction references IA(MX and IA(MY), which are chosen from the reference series of MA and which are so configured that remaining nodes in the network T will "believe" that the references shall be routed to the node MA of the meeting organizer. The reference IA(MX) shall be interpreted as meaning that the interaction reference relates to a meeting individual generated by an assignment process that cooperates with an assignment process in node X, whereas the reference IA(MY) shall be interpreted as meaning that the interaction reference relates to a meeting individual generated by an assignment process which cooperates with an assignment process in node Y.

The assignment process in the meeting organizer then signals IA(MX) to the node X over a signalling network, as illustrated schematically by the broken arrow 2. Upon receipt of IA(MX), the assignment process PA makes a call using IA(MX) as the destination address, therewith establishing a connection from X to MA, as illustrated schematically by the full arrow 3.

The assignment process in the meeting organizer signals IA(MY) to the node Y over a signalling network shown schematically by the broken arrow 4. Subsequent to receipt of IA(MY), the assignment process makes a call using IA(MY) as the destination address, thereby establishing a connection from Y to MA, as shown schematically by the full arrow 5.

The assignment process MI in the meeting organizer MA monitors the activity on the incoming ports of the meeting organizer and discovers an incoming call which refers to IA(MX). The assignment process in the meeting organizer then initiates a reference analysis. The result of this analysis shows that the incoming call refers to IA(MX) which, in turn, is related to a meeting individual which, in turn, has a relationship with IA(MY). The meeting organizer now awaits an incoming call which refers to IA(MY) and when this call arrives, the assignment process in the meeting organizer couples the connection from A to the connection from B and the parties A and B are now mutually connected.

The functionalities of the meeting organizer and those functionalities with which MA coacts in the nodes X and Y are implemented in the form of software which controls conventional communication equipment in the various nodes.

The references PA and PB can be taken to be signal references which are used when signalling between assignment processes, in order to identify separate requesting individuals. The references IA(MX) and IA(MY) are connection references which are used by assignment processes to establish connections.

Figure 2:
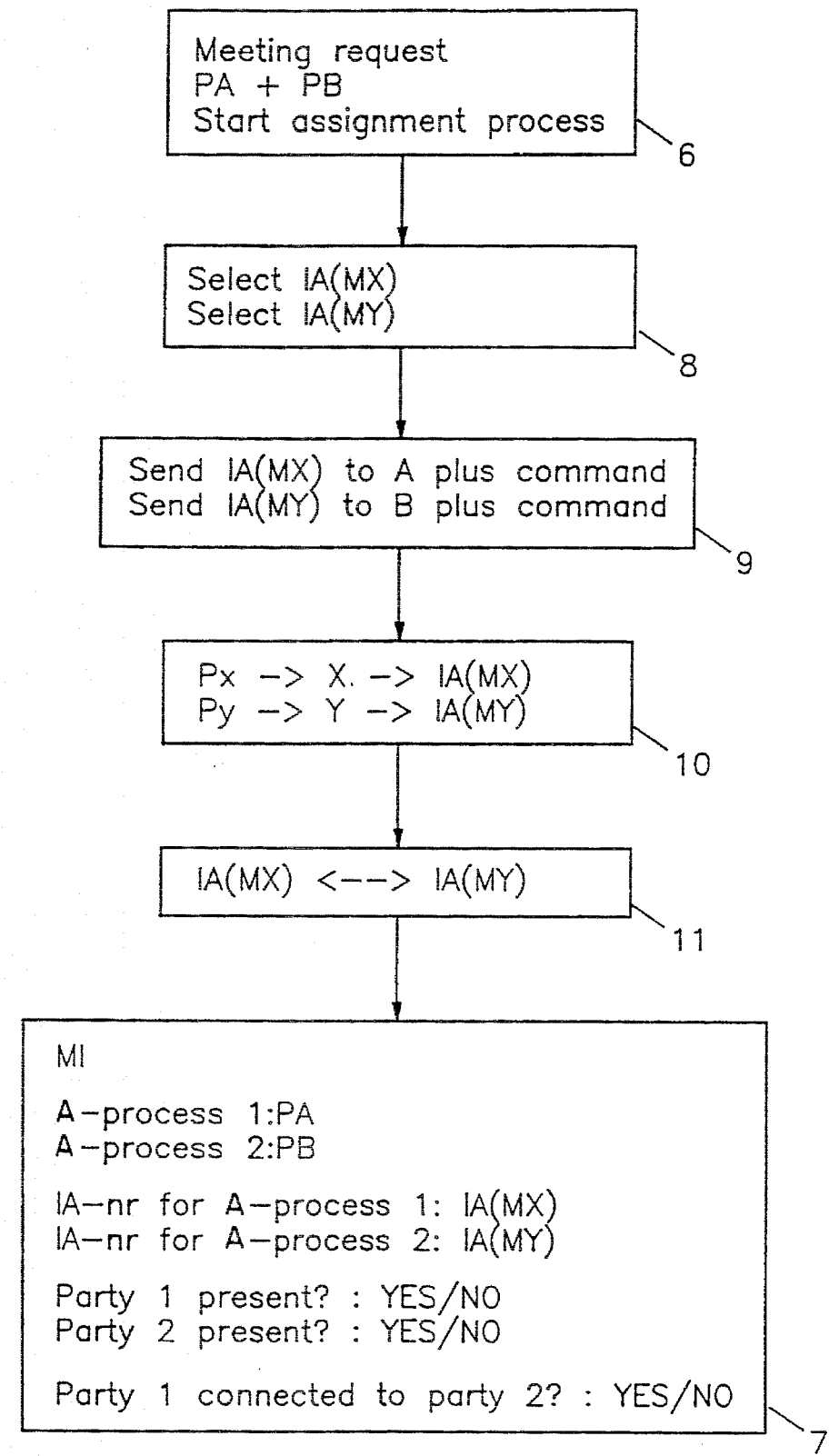
FIG. 2 is a flow sheet illustrating the method according to FIG. 1.

FIG. 2 is a flow sheet which illustrates the method according to FIG. 1. As illustrated in box 6, the meeting organizer receives a meeting request which contains the references PA and PB relating to assignment processes of the parties concerned. In response to this meeting request, the software in MA starts up the assignment process which initiates the meeting individual MI, this individual being a data record symbolically identified by the reference numeral 7 in FIG. 2. The meeting individual MI is related solely to the meeting concerned and includes a number of fields in which the assignment process writes in information. Among other things, the meeting individual includes a first field in which the reference PA to the assignment process of one party is written, and a second field in which the reference PB to the assignment process of the other party is written. In the next stage of the process, box 8, the meeting organizer selects the two IA-references called IA(MX) and IA(MY) chosen in the aforedescribed manner. In the next stage of the process, box 9, the meeting organizer sends IA(MX) to the node X while commanding the node X to call the meeting node and to state IA(MX) as the destination address when making the call. IA(MX) is also noted in a field in the meeting individual. In a similar manner, the meeting organizer sends IA(MY) to the node Y and commands the node Y to call the meeting node and to give IA(MY) as the destination address. IA(MY) is also noted in a field in the meeting individual MI.

The next stage in the process, box 10, involves two activities. In one activity, the assignment process in the meeting X makes an outgoing call while giving IA(MX) as the destination address, and couples A's connection with its node X and with the outgoing connection 3. In the other of these activities, the assignment process in the node Y makes a call while giving IA(MY) as the destination address, and couples B's connection to node Y with the outgoing connection 5.

In the last stage of the process, box 11, the assignment process in the meeting organizer monitors the activity on the ports of the meeting node MA. As soon as a call is made which gives an IA-reference, the meeting organizer searches through its meeting individuals and marks as present the party concerned with the meeting. This marking is effected in a separate field in a corresponding meeting individual. When both parties of a meeting are present in the meeting node, the assignment process in the meeting organizer will be aware of the ports on which the connection of respective parties have arrived and will couple these ports together and thereby establish the connection between the parties.

In the FIG. 3 illustration, the meeting organizer MA of FIG. 1 has been given the purpose of organizing a meeting between party A, located in a node X close to A, and party B, located in another node Y close to B. MA does not decide how the connection route through the intermediate network between X and Y shall be established. Instead, MA sends a new meeting request to a new meeting organizer MA1 in FIG. 3, together with references to the assignment processes PA and PB that are to be coupled together. MA assigns the selection of a route between the local stations X and Y to MA1. The new meeting organizer MA1 can now choose to place the meeting at the node in which MA1 is located, by applying the same method as that described with reference to FIG. 1. MA1 then chooses two IA-references, IA(MX) and IA(MY), and sends IA(MX) to node X and IA(MY) to node Y. This transmission of the IA-references is marked by the broken arrows 12 and 13 and takes place on a signalling network. The assignment process in node X and the assignment process in node Y then call the new meeting organizer MA1 and connection routes are established from X to MA1 and from Y to MA1, as illustrated by the full arrows 14, 15. The assignment process in the node X couples the connection from A to the node X with the outgoing connection 14, and the assignment process in the node Y couples the connection from B to the node Y with the outgoing connection 15. Finally, the connections 14 and 15 are coupled together internally within the node in which the meeting organizer MA1 is found.

Figure 10:
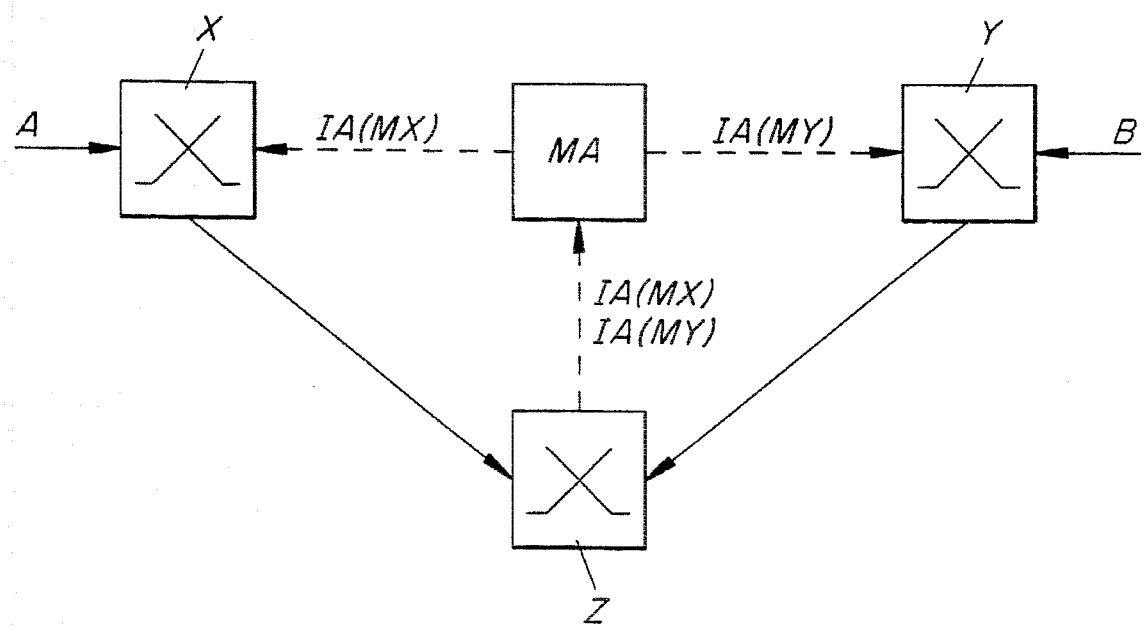
FIG. 10 illustrates a method in which the meeting point is placed in another node between two nodes.

Instead of placing the meeting in the meeting node MA1, it may be found after analyzing the traffic load on the own node MA1 and after analyzing the traffic load on node X, and analyzing the traffic load on the node Y, or after analyzing the traffic load on other nodes, that the meeting should take place in node X, in node Y or perhaps in one of the other nodes Z, as illustrated in FIG. 10.

Figure 4:
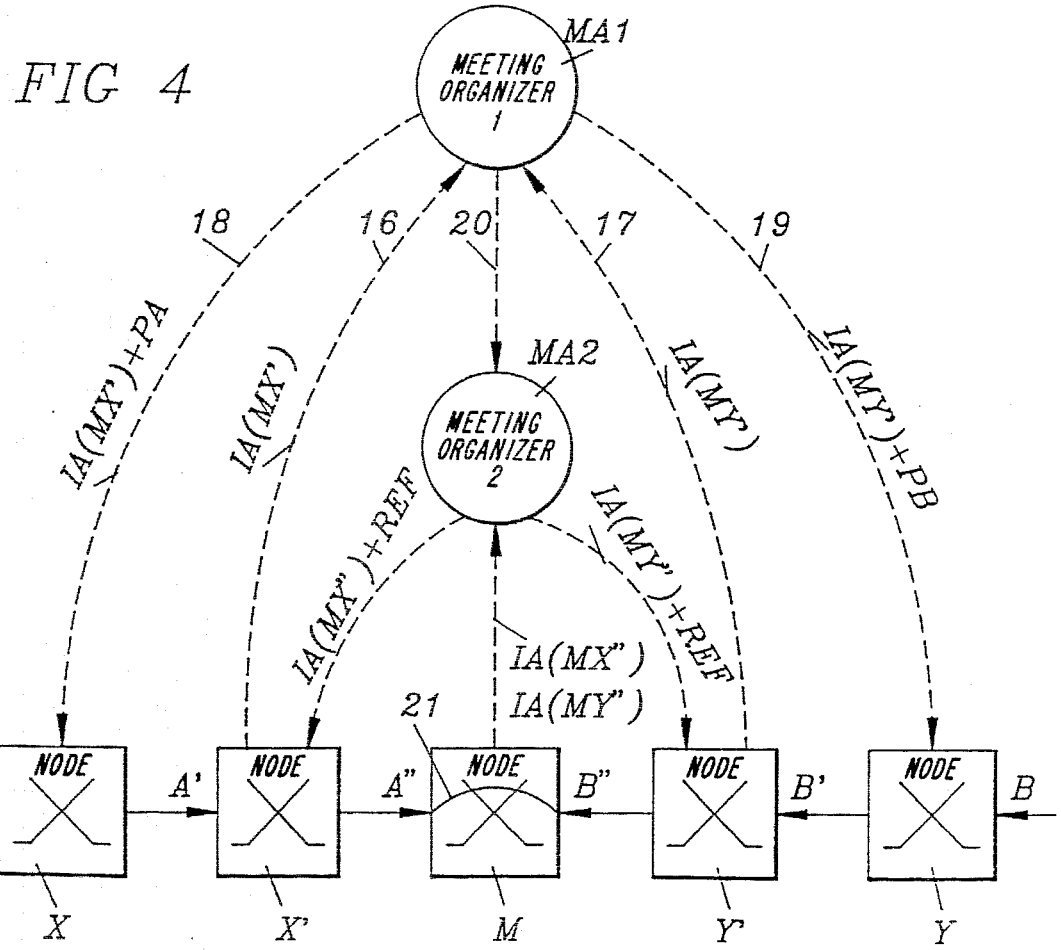
FIG. 4 illustrates a method in which the meeting point is placed on a connection between several nodes.

If the meeting is to take place in one of the other nodes, the principle of establishing a meeting connection in accordance with FIG. 3 can be applied recursively, as illustrated in FIG. 4.

The method illustrated in FIG. 4 takes as its starting point the assumption that a meeting organizer MA1 is aware of the references PA and PB of the assignment processes in the nodes X and Y respectively. The nodes X and Y are called end nodes. The meeting organizer MA1 chooses two nodes X' and Y' respectively to which the connection from X and the connection from Y shall be delivered. MA1 turns to node X' asking for an IA-reference, here called IA(MX'), to be reserved. The node X' sends this reference to MA1 over a signalling network, as shown symbolically by the broken arrow 16.

Similarly, MA1 asks node Y' to reserve an IA-reference called IA(MY'), and this IA-reference is signalled from Y' to MA1 over a signalling network, as shown symbolically by the broken arrow 17. This signalling network may be identical with the signalling network 16, although not necessarily so. MA1 then sends IA(MX') to the node X together with PA as a meeting reference, and commands the node X to call node X' while giving IA(MX') as the destination address. MA1 commands node X' to park an incoming call which gives IA(MX') as a reference and to await further instructions. The transmission of IA(MX') to node X is symbolized by the broken arrow 18. Correspondingly, IA(MY') is transmitted to the node Y together with PB, as shown symbolically by the broken arrow 19. MA1 then transfers the role of meeting organizer to a new meeting organizer MA2 and transfers the references IA(MX') and IA(MY') to MA2 over a symbolically shown signalling network 20. At the same time, the meeting organizer MA1 commands the meeting organizer MA2 to organize a meeting with the meeting references given. Node X then calls node X' while giving IA(MX') as the destination address, and node Y calls node Y' while giving IA(MY') as the destination address. Party A has now been connected up to A' and party B has been connected up to B'. The aforedescribed procedure is then repeated, by MA2 turning to a meeting node and requesting two IA-references, called IA(MX") and IA(MY"), these IA-references being transmitted by MA2 to X' and Y' respectively, together with the earlier references IA(MX') and IA(MY') respectively. X' then calls the meeting organizer M while giving IA(MX") as the destination address, and connects the parked call from A' with the outgoing connection to M. The node Y' carries out a corresponding procedure. As a result, A' connects with A" in the meeting node M and B' connects with B" in the same node M. When the assignment process in the node M discovers that both of the assignment processes concerning A" and B" refer to the same assignment process in M, the assignment process in node M couples the connections together, as shown by the full line 21.

It will thus be clear that the principle of establishing a meeting connection is a highly efficient mechanism which enables a meeting point to be located in a connection between one, two or more nodes by applying a recursive procedure.

Figure 5:
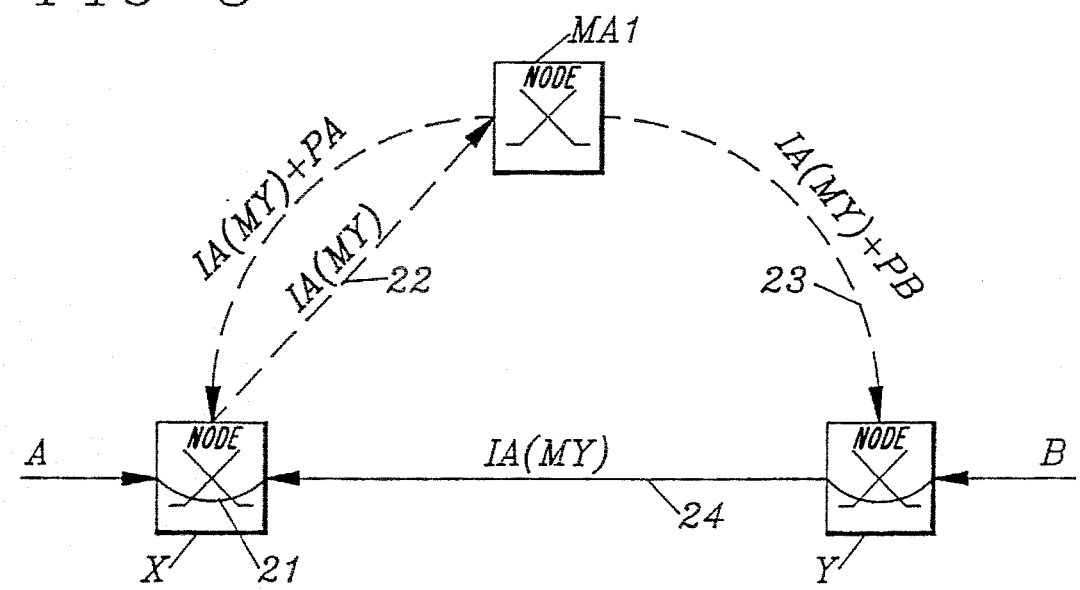
FIG. 5 illustrates a method in which the meeting point is placed on an end node.

FIG. 5 illustrates the case in which the assignment process in the meeting node MA1 chooses to place the meeting at node X. In this case, MA1 requests from node X an IA-reference, called IA(MY), and node X sends this IA-reference to MA1 over a signalling route symbolized by the broken arrow 22. MA1, which is aware of the parties' respective reference PA and PB, sends IA/MY) and the reference PA to the meeting node X while asking the node to connect the parked call from A with an incoming call which gives IA(MY) as the destination address. At the same time, MA1 sends the IA-reference IA(MY) to the node Y, over a signalling path symbolically shown by the broken arrow 23, and also sends PB as a reference to the assignment process in node Y. At the same time, MA1 commands the node Y to make an outgoing call with IA(MY) as the destination address and to connect the parked connection from B with the port that has the outgoing connection with the destination address IA(MY). The assignment process in node Y then establishes a coupling route to node X and gives IA(MY) as the destination address. The coupling route is identified by the full line 24. The connection route 24 represents a connection which may either be physical or virtual, depending on whether a circuit-oriented network or a packet-oriented network is used. When the assignment process in node X receives the aforesaid call with destination address IA(MY), the node X connects the port on which this call arrives with the parked call from party A, as marked by the full line 21, therewith establishing the connection between A and B and placing the meeting point in the node to which A belongs.

If the meeting is to be placed in node Y instead, MA1 takes out an IA-reference in Y and the described procedure is repeated, but with the difference that in this case it is node X that makes an outgoing call to Y.

The traffic load in different nodes can be made the basis for the selection of meeting organizer and meeting point. The meeting organizer and the meeting point can also be chosen on the basis of the cost of the connection. For instance, if party A wishes to establish a connection with party B, it is reasonable to expect party A to pay for the connection. It is then appropriate to choose the node which is nearest B as the meeting point. If party B wishes to call party A, it is reasonable to expect party B to pay for the call and then to choose the node located closest to A as the meeting point. If party B wishes to establish connection with party A but party B does not wish to pay for the call, it is still possible to organize the connection by a method similar to present-day "collect" or "reversed charges" calls. If parties A and B are located far away from one another and both wish for the connection to be established, it is reasonable for both parties to share the costs and to place the meeting point somewhere between A and B. It is not necessary to change the existing telecommunication networks when practicing such a method, and the costs can be shared by practicing the inventive method. As mentioned by way of introduction, it is also possible to select a meeting point so that the cost of establishing the connection will be the cheapest possible. By way of an additional criterion, the cost of the connection shall be the cheapest possible in the absence of congestion. Another alternative is to use toll-ticketing and to charge the A-subscriber with a charge which does not depend on the meeting point but solely on the geographical location of party A and party B.

As will be seen from the example illustrated in FIG. 4, and also indirectly from the example illustrated in FIG. 3, it is not necessary for the meeting organizer to be a switching node, i.e., the meeting organizer need not include a switch. It is sufficient for the meeting organizer to include a computer and associated software which is capable of administrating a meeting.

Figure 6A:
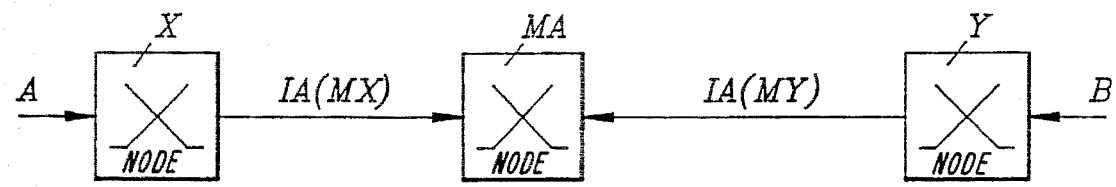
FIG. 6A–6C illustrate a method in which one party may be mobile while still retaining its meeting access point in a node and how a meeting can be moved and the connection between the parties reestablished.
Figure 6B:
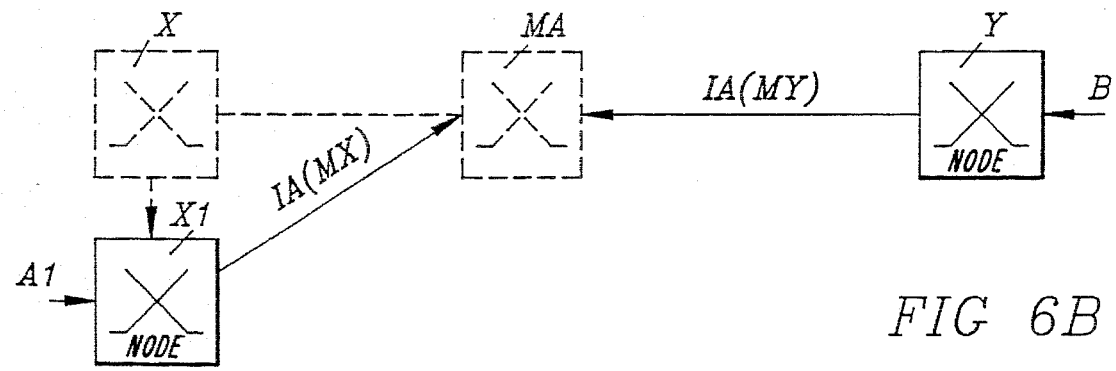
Figure 6C:
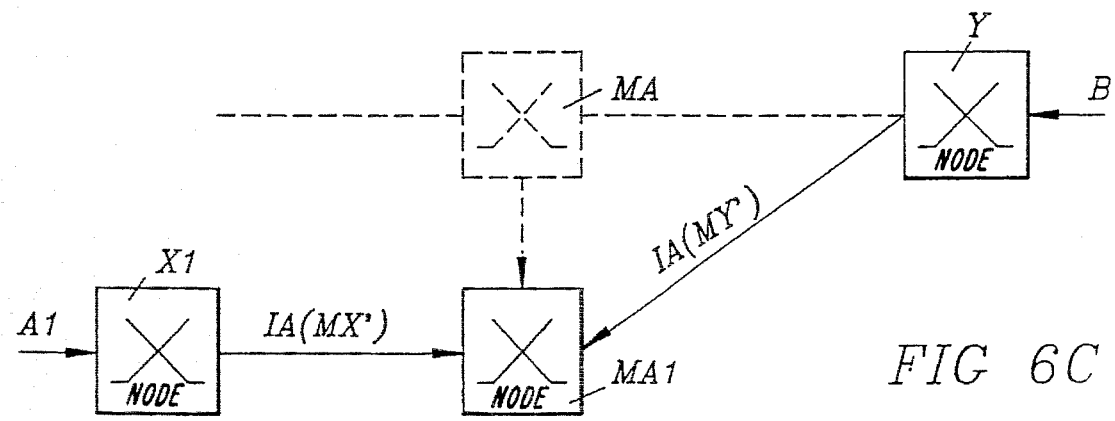

FIGS. 6A–6C illustrate different possibilities of moving a connection with one meeting point from one node to another, or from moving a meeting point from one node to another. FIG. 6A is identical to FIG. 1, whereas FIG. 6B illustrates how the node X is able to transfer the connection from one subscriber A in node X to another subscriber A1 in another node X1, from where a connection is coupled to the assignment process in the meeting organizer MA. Thus, in FIG. 6B, the meeting organizer has first assigned the interaction reference IA(MX) to the connection delivering node X, whereafter the connection delivering node X has transferred, via a signalling network (not shown), the interaction reference IA(MX) to a new node X1, from where a new connection is established with the same, original meeting node MA by giving IA(MX) as the destination address. The transfer of the interaction reference from node X to node X1 can be initiated from either MA or from the party A.

Finally, FIG. 6C illustrates how the meeting organizer MA is able to transfer the meeting in the meeting node MA to a new node MA1 in a manner similar to that described with reference to FIG. 4, where MA1 transfers the meeting between party A' and party B' to a new meeting node M.

When practicing the method according to the invention, a meeting is continued until both parties A and B are decided that the connection therebetween shall be released or disconnected. The meeting is also maintained irrespective of whether the telecommunication network T utilizes single-path calling party release or not. Single-path connection release means that a connection between two parties is released when one of the parties breaks the connection, e.g. by replacing the telephone receiver, in that case when the network is a conventional telephone network PSTN. Consider FIGS. 6A and 6B assume that the network is a telephone network which uses single-path connection release. When subscriber A in FIG. 6A replaces the telephone receiver, the connection between A and MA is released but the meeting in MA prevails. The user A is now able to command, e.g. via a signalling network, user A1 present in another node X1, shown in FIG. 6B, to phone user B while using the same IA-reference IA(MX) as that earlier used by user A. When A1's call arrives at MA, the assignment process in MA will note that party A1 has used the IA-reference IA(MX). MA then searches its meeting individuals to ascertain the purpose for which this IA-reference has been allotted and finds that a call which uses this IA-reference shall be coupled with the call which uses the IA-reference IA(MY). The assignment process in MA thus couples the incoming connection from A1 to the existing incoming connection from B.

Figure 7:
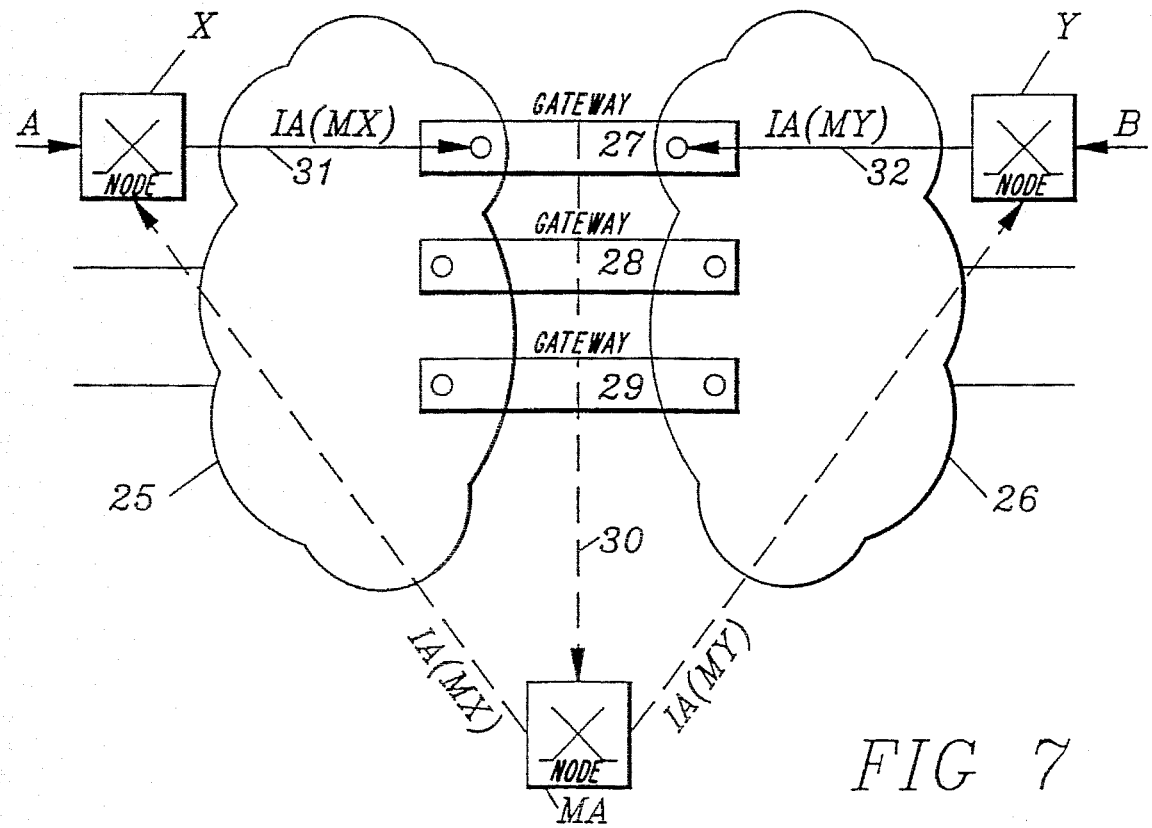
FIG. 7 is a block schematic illustrating the use of a number of gate-way-units between two different telecommunication networks.

FIG. 7 illustrates two different telecommunication networks 25 and 26, for instance a telephony network and a circuit-oriented data network. The signals in the network 25 are of a kind which differ from the signals in the other network 26, thereby making direct communication between the networks 25 and 26 impossible. However, signals in one network can be converted to signals of the type used in the other network, and vice versa, with the aid of a number of so-called gateways shown symbolically by reference numerals 27, 28, 29. This enables users in the two networks to communicate with one another via a gateway. A meeting organizer MA is aware of the geographical location of each of these gateway units 27–29. Assume that MA has received a connection request in which MA is asked to connect A to B. Initially, MA selects a suitable gateway with regard to the geographical location of party A and of party B. It is assumed in FIG. 7 that the gateway 27 is the most suitable gateway. MA then turns to gateway 27, via a signalling network shown symbolically by the broken arrow 30, and requests two meeting references. Gateway 27 reserves two meeting references and sends these references to MA over the signalling network. These references are two IA-references of the kind described in copending U.S. patent application Ser. No. 08/018,268, and are designated IA(MX) and IA(MY). MA sends IA(MX) to the node X and IA(MY) to the node Y and commands respective nodes to call while giving respective IA-references. When gateway 27 discovers that there is an incoming call 31 which refers to IA(MX) and another incoming call 32 which refers to IA(MY), the two incoming calls are coupled together, thereby establishing a connection between party A and party B.

Figure 8:
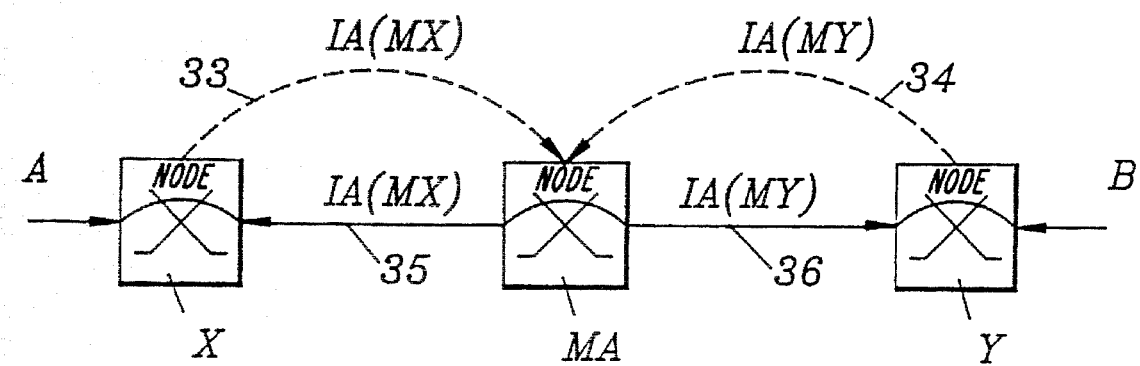
FIG. 8 is a block schematic which illustrates another embodiment of the inventive communication method.

Instead of each party A and B establishing a connection to the meeting node in accordance with features (5)–(8) above, it is possible, in accordance with a second embodiment of the invention, for an assignment process in the meeting organizer to command the meeting node to establish two outgoing connections, one to the node X of party A and another to the node Y of party B. A particular example of this second embodiment is illustrated in FIG. 8, where the meeting node is placed at the meeting organizer. The same conditions apply as those according to features (1)–(4) above, i.e., that the meeting organizer is aware that party A and party B shall be connected to one another and that the meeting organizer is also aware of the assignment processes PA and PB.

Instead of the meeting organizer MA, according to feature (6) above, signalling the interaction numbers to respective nodes X and Y and the nodes calling in accordance with feature (7) above, the meeting broker MA, after having received the connection request, assigns a meeting node and reserves a respective interaction number in each node X and Y. Node X sends the interaction reference IA(MX) to MA on a signalling path 33, and the node Y sends the reserved interaction reference IA(MY) to MA on a signalling path 34. The meeting organizer MA is aware of the assignment processes PA and PB and creates a first relationship between IA(MX) and PA, a second relationship between IA(MY) and PB, and a third relationship between PA and PB. The assignment process in MA then sets-up two outgoing connections, one, referenced 35, to the node X and the other, referenced 36, to the node Y and mutually couples the connections 35 and 36 internally in MA, as illustrated by the curved line in the rectangle representing MA. When the node X terminates the connection 35, a typical reference analysis is performed in the node. The result of this reference analysis shows that an incoming connection which gives IA(MX) as the destination address shall be linked to the assignment process PA. The node X then couples the terminated connection 35 internally with party A, as indicated by the curved line in the rectangle symbolizing node X. Corresponding processes take place in node Y, in which the connection 36 is terminated and coupled with the call from party B internally in the node Y. The parties A and B are now connected together and are able to converse with one another. The method according to this second embodiment of the invention differs from the first embodiment in that the interaction references are not reserved in the meeting node but that an interaction reference is reserved in the reference series of the node X and another interaction reference is reserved in the reference series of node Y. Another difference is that the meeting node sets up two outgoing, so-called originating connections, one to the node X and the other to the node Y.

Figure 9:
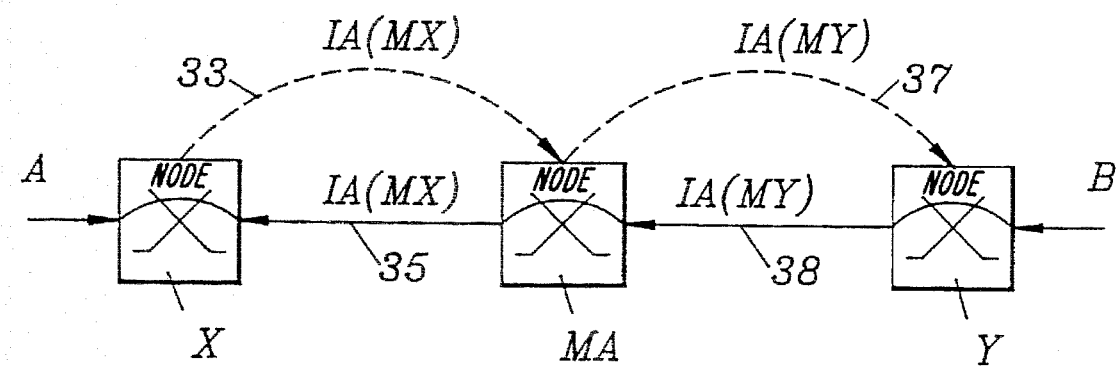
FIG. 9 is a block schematic which illustrates a third embodiment of the inventive communication method.

According to a third embodiment of the invention, the connection between A and B is established by means of a method which can be said to comprise a combination of the method according to FIG. 1 and the method according to FIG. 8. This third embodiment of the invention is described with reference to FIG. 9. The starting point of the method according to FIG. 9 is the same as that described above with reference to features (1)–(4) and with reference to FIG. 1. In order to make the description easier, it is also assumed in this case that the meeting node is placed in the meeting organizer. When the assignment process in the meeting organizer MA receives a connection request, the meeting organizer turns to node X and requests the reservation of an interaction reference, here designated IA(MX). Node X signals IA(MX) to the meeting organizer MA, via the signalling connection 3. The assignment process in MA reserves an interaction reference, designated IA(MY) from its own reference series and signals IA(MY) to the node Y via a signalling connection 37, and commands the assignment process in node Y to make a call while using IA(MY) as the destination address. The assignment process in MA then calls the node X while giving IA(MX) as the destination address. A reference analysis is carried out in node X in the same way as that described above with reference to FIG. 8, when the connection 35 is terminated and the connection from party A is coupled internally in the node X with the connection 35, as indicated by the swung line within the rectangle representing node X. When the assignment process PB in node Y makes a call while giving IA(MY) as the destination address, a connection 38 with the meeting organizer MA is established. The party B is coupled internally in the node Y with the outgoing connection 38, as indicated by the curved line within the rectangle representing the node Y. A reference analysis is performed when the meeting organizer MA terminates the connection 38. The result of the reference analysis discloses that a call which uses IA(MY) as the destination address shall be linked to the assignment process in MA which was commenced when MA received the connection request. The assignment process in MA is thus aware that the connection 38 shall be linked to the meeting individual MI, and therefore couples the connection 38 terminated in MA internally with the connection 35 originating from MA. This internal connection is represented by the curved line in the rectangle that represents MA. The parties A and B are now mutually connected and can communicate with one another.

Thus, according to this third embodiment of the invention, one interaction reference is reserved in node X and another interaction reference is reserved in the node in which the meeting organizer MA is found. According to the third embodiment of the invention, the meeting organizer terminates a connection and originates a connection.

As a variant of this third embodiment of the invention, the meeting organizer MA may originate a connection to node Y and terminate a connection from node X. In this case, MA has reserved an IA-reference IA(MY) in node Y and another IA-reference IA(MX) in its own node MA. Thus, according to this variant, a first connection from X to MA and a second connection from MA to Y are coupled together. These two connections are coupled together internally in MA. A is coupled internally in X with the first connection to MA, and B is coupled with the second connection internally in Y. In this case, the difference between the inventive technique and the traditional switching technique is that the node MA can be freely chosen or chosen on the basis of the traffic load on the nodes X, Y, MA, as described in FIG. 3, or on the basis of the billing of the connection, as described with reference to FIG. 5, and that the technique is not governed by conventional, fixed routing tables.

Although not described above, it will be understood that when both parties A and B have terminated the call, the established connections are released and the connection requesting individuals PA and PB and the meeting individual MI are annulled.

It will also be understood that the aforedescribed embodiments of the invention can be modified and varied within the scope of the following claims.

I claim:

1. A method of establishing in real time a connection between a first party and a second party via at least one telecommunication network, said parties having previously agreed upon to establish communication therebetween and, as a result thereof, a first call from said first party has arrived to a first node of the network and a second call from said second party has arrived to a second node of the network, said method comprising the steps of:

selecting any of the switching nodes of said network as a meeting place;

reserving first and second idle interaction numbers in said selected switching node, said interaction numbers being selected in the number series of said selected switching node;

creating a first assignment process in said first node;

creating a second assignment process in said second node, said first assignment process making an outgoing call using the first interaction number, said second assignment process making an outgoing call using the second interaction number;

routing said outgoing calls through said network to said selected node; and interconnecting with each other incoming calls to said selected node that as destination use said first and second interaction numbers.

2. A method according to claim 1, wherein the selected node is located in a node selected from the group of nodes comprising:

(a) the access node of said first party in said telecommunication network;

(b) the access node of said second party in said telecommunication network; and (c) some other node of said telecommunication network.

3. A method according to claim 2, comprising the step of initiating said meeting by sending a connection request together with meeting references to a third party, called the meeting organizer, said meeting references referring to said meeting, said meeting organizer:

selecting on the basis of predetermined criteria a meeting node common to the first and second parties;

deciding the connections required to be made to and from the respective access nodes of said first and said second party respectively and the connections required to be made to and from said meeting mode to accomplish a real time connection, by indicating to said assignment processes which one of these that shall originate connections and terminate connections, respectively.

4. A method according to claim 3, wherein a first meeting reference is created by said first assignment process in said first switching node to which said first party has access and a second meeting reference is created by said second assignment process in said second switching node to which said second party has access, said first and second meeting references referring to the meeting the parties have agreed upon.

5. The method in accordance with claim 3, wherein a meeting point is located in the access node of the first party, and a node in which a meeting organizer is located is a part of the connection between the first and second parties, and wherein the meeting organizer:

reserves a first interaction number in the meeting point and a second interaction number in its own node, sends the second interaction number and said command to the access node of the second party, terminates a first connection originated from the access node of the second party, originates a second connection towards the meeting point, and internally interconnects the terminated first connection with the originated second connection.

6. The method according to claim 5, wherein said predetermined criteria involves the meeting organizer collecting information concerning the traffic load on nodes in the telecommunication network and in other telecommunication networks.

7. The method according to claim 6, wherein a new meeting organizer is chosen to keep the cost of the connection at a minimum.

8. The method according to claim 7, wherein a new meeting organizer is chosen with the additional condition that the cost of establishing the connection shall be a minimum cost in the absence of congestion.

9. The method of claim 7, wherein on the basis of the predetermined criteria, the meeting organizer decides whether or not to transfer a connection request to another meeting organizer optionally located in another telecommunication network.

10. The method in accordance with claim 2, wherein the meeting point is located in the access node of said first party, and the node in which a meeting organizer is located does not form any part of the connection between the first and second parties, and wherein the meeting point reserves an interaction number in the access node of the first party and associates the interaction number with the connection request of the first party, the meeting organizer sends the first interaction number to the access node of the second party, the access node of the second party originates a connection towards the meeting point using the interaction number as an address, and the meeting point terminates the connection from the access node of the second party and interconnects the connection with the first party.

11. The method in accordance with claim 2, wherein a first meeting point is located in the access node of the first party, a second meeting point is located in the access node of the second party, and a node in which a meeting organizer is located forms a part of the connection between the first and second parties, and wherein the meeting organizer reserves a first interaction number in the meeting point and a second interaction number in the access node of the second party, originates two connections, a first one towards the first meeting point using the first interaction number as an address, and a second one towards the second meeting point using the second interaction number as an address, and interconnects internally the two originating connections, and the first meeting point terminates the first connection and internally interconnects the first connection with the first party, and the second meeting point terminates the second connection and internally interconnects the second connection with the second party.

12. A method according to claim 1, wherein said meeting node is selected by (a) first selecting a temporary first meeting node from which said first interaction number is selected, and temporarily parking said first outgoing call in said first temporary meeting node;

(b) selecting a temporary second meeting node from which said second interaction number is selected, and temporarily parking said second outgoing call in said second temporary meeting node;

(c) selecting a third switching node as a common meeting point;

(d) routing said temporarily parked first and second calls to said third switching node by communicating a new first interaction number selected from said third switching node to said first assignment process associated with said first temporarily parked call and by communicating a new second interaction number, selected from said third switching node to said second assignment process associated with said second temporarily parked call; and (e) interconnecting said first and second calls in said third switching node.

13. The method in accordance with claim 12, wherein steps (a) and (b) are repeated for successive new first and second switching nodes, from which successive new first and second interaction numbers are selected, until step (c) is performed.

14. A system for establishing in real time a connection between a first party and a second party via at least one telecommunication network, said parties having previously agreed upon to establish communication therebetween and, as a result thereof, a first call from said first party has arrived to a first node of the network and a second call from said second party has arrived to a second node of the network, said system comprising:

means for selecting any of the switching nodes of said network as a meeting place;

means for reserving first and second idle interaction numbers in said selected switching node, said interaction numbers being selected in the number series of said selected switching node;

means for creating a first assignment process in said first node;

means for creating a second assignment process in said second node, said first assignment process making an outgoing call using the first interaction number, said second assignment process making an outgoing call using the second interaction number;

means for routing said outgoing calls through said network to said selected node; and means for interconnecting with each other incoming calls to said selected node that as destination use said first and second interaction numbers.

* * * * *